(12) United States Patent
Yoshii

(10) Patent No.: US 10,340,530 B2
(45) Date of Patent: Jul. 2, 2019

(54) ALKALINE DRY CELL

(71) Applicant: Panasonic Intellectual Property Management Co., Ltd., Osaka (JP)

(72) Inventor: Kazuhiro Yoshii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/760,336

(22) PCT Filed: Oct. 11, 2016

(86) PCT No.: PCT/JP2016/004532
§ 371 (c)(1),
(2) Date: Mar. 15, 2018

(87) PCT Pub. No.: WO2017/110023
PCT Pub. Date: Jun. 29, 2017

(65) Prior Publication Data
US 2018/0254493 A1    Sep. 6, 2018

(30) Foreign Application Priority Data

Dec. 21, 2015  (JP) .................................. 2015-248849

(51) Int. Cl.
*H01M 6/08*    (2006.01)
*H01M 4/06*    (2006.01)
(Continued)

(52) U.S. Cl.
CPC ........... *H01M 6/08* (2013.01); *H01M 2/0227* (2013.01); *H01M 4/06* (2013.01); *H01M 4/50* (2013.01);
(Continued)

(58) Field of Classification Search
None
See application file for complete search history.

(56) References Cited

U.S. PATENT DOCUMENTS

2009/0317711 A1    12/2009    Kato
2012/0094159 A1    4/2012    Okada et al.
2013/0236775 A1    9/2013    Nunome et al.

FOREIGN PATENT DOCUMENTS

JP    57-107560 A    7/1982
JP    2009-158257    7/2009
(Continued)

OTHER PUBLICATIONS

Endo et al. JP 2015138668 A, machine traslation (Year: 2015).*
(Continued)

*Primary Examiner* — Wojciech Haske
(74) *Attorney, Agent, or Firm* — McDermott Will & Emery LLP

(57) ABSTRACT

An alkaline dry cell includes a bottomed cylindrical cell case, a positive electrode packed in the cell case and is made of a stack of n pieces of hollow cylindrical pellets, a negative electrode disposed in a hollow portion of the pellets, a separator interposed between the positive electrode and the negative electrode, and an alkaline electrolytic solution. A thickness of a body portion of the cell case is 0.08 to 0.16 mm. "n" is an integer of 3 or more. An average density $d_m$ of manganese dioxide in the n pellets is 2.80 to 3.00 g/cm$^3$. A density of manganese dioxide of at least one pellet positioned in a middle portion in a height direction of the stack is 2.75 g/cm$^3$ or less.

2 Claims, 4 Drawing Sheets

(51) Int. Cl.
  *H01M 4/50* (2010.01)
  *H01M 2/02* (2006.01)
  *H01M 4/66* (2006.01)
  *H01M 4/02* (2006.01)
  *H01M 4/75* (2006.01)

(52) U.S. Cl.
  CPC ............ *H01M 6/085* (2013.01); *H01M 4/661* (2013.01); *H01M 4/75* (2013.01); *H01M 2004/027* (2013.01); *H01M 2004/028* (2013.01); *H01M 2300/0014* (2013.01)

(56) References Cited

FOREIGN PATENT DOCUMENTS

| | | | |
|---|---|---|---|
| JP | 2015138668 A | * | 7/2015 |
| WO | 2012/049720 | | 4/2012 |

OTHER PUBLICATIONS

International Search Report of PCT application No. PCT/JP2016/004532 dated Jan. 10, 2017.
The Extended European Search Report dated Jan. 4, 2019 for the related European Patent Application No. 16877928.8.

* cited by examiner

ALKALINE DRY CELL

This application is a U.S. national stage application of the PCT International Application No. PCT/JP2016/004532 filed on Oct. 11, 2016, which claims the benefit of foreign priority of Japanese patent application 2015-248849 filed on Dec. 21, 2015, the contents all of which are incorporated herein by reference.

TECHNICAL FIELD

The present invention relates to an improvement of a positive electrode in an alkaline dry cell provided with a cell case having a body portion whose thickness is small.

BACKGROUND ART

An alkaline dry cell has a large capacity, and from which a large electric current can be taken out. Therefore, the alkaline dry cell is widely used. In view of increasing a capacity, it is considered to be advantageous to reduce a thickness of a cell case (in particular, a body portion of the cell case) that does not contribute to capacity of an alkaline dry cell.

A positive electrode of an alkaline dry cell is made of a pellet including manganese dioxide powder as a positive electrode active material and graphite powder as a conductive agent. In an alkaline dry cell, manganese dioxide expands during discharging, so that a positive electrode as a whole expands.

Patent Literature (PTL) 1 proposes that in an alkaline dry cell in which the body portion of the cell case has a thickness in a range from 0.1 to 0.17 mm, the density of graphite in the positive electrode material is adjusted in order to suppress increase in the dimension of the outer diameter of the cell after discharging while high capacity is secured. In PTL 1, stress caused by the expansion of manganese dioxide is allowed to diffuse by setting the density of graphite to a specific range.

On the other hand, in PTL 2, in order to enhance the discharging performance of an alkaline dry cell, a packing density of manganese dioxide in a positive electrode and a packing density of zinc in the negative electrode are adjusted, and at the same time, the relation between these packing densities and thicknesses in the diameter direction of the positive electrode and the negative electrode is adjusted.

CITATION LIST

Patent Literature

PTL 1: Japanese Patent Unexamined Publication No. 2009-158257
PTL 2: International Publication WO2012/49720

SUMMARY OF THE INVENTION

In an alkaline dry cell, in view of increasing capacity, when the density of manganese dioxide in a positive electrode is increased, expansion of a positive electrode at the time of discharging is remarkable. In the vicinity of the middle in the height direction of the cell (or a region other than the both end parts in the height direction), expansion of the positive electrode is particularly remarkable. The study by the present inventors has revealed that when a cell case having a body portion whose thickness is small is used in a state in which the density of manganese dioxide is increased, a rupture of a cell case occurs from the vicinity of the middle.

An object of the present disclosure is to secure a high capacity and suppress a rupture of a cell case in an alkaline dry cell using a cell case having a body portion whose thickness is small.

One aspect of the present disclosure relates to an alkaline dry cell including: a bottomed cylindrical cell case; a positive electrode packed in the cell case, and is made of a stack of n hollow cylindrical pellets; a negative electrode disposed in a hollow portion of the pellets; a separator interposed between the positive electrode and the negative electrode; and an alkaline electrolytic solution. A thickness of a body portion of the cell case is 0.08 to 0.16 mm. The positive electrode includes manganese dioxide and a conductive agent. "n" is an integer of 3 or more. An average density $d_m$ of manganese dioxide of the n pellets is 2.80 to 3.00 g/cm$^3$. A density $d_c$ of manganese dioxide of at least one pellet positioned in a middle portion in a height direction of the stack is 2.75 g/cm$^3$ or less.

An alkaline dry cell according to the present disclosure includes a cell case having a body portion whose thickness is small and can secure a high capacity, and, at the same time, can suppress a rupture of the cell case.

DESCRIPTION OF EMBODIMENTS

[Alkaline Dry Cell]

Figure 1:
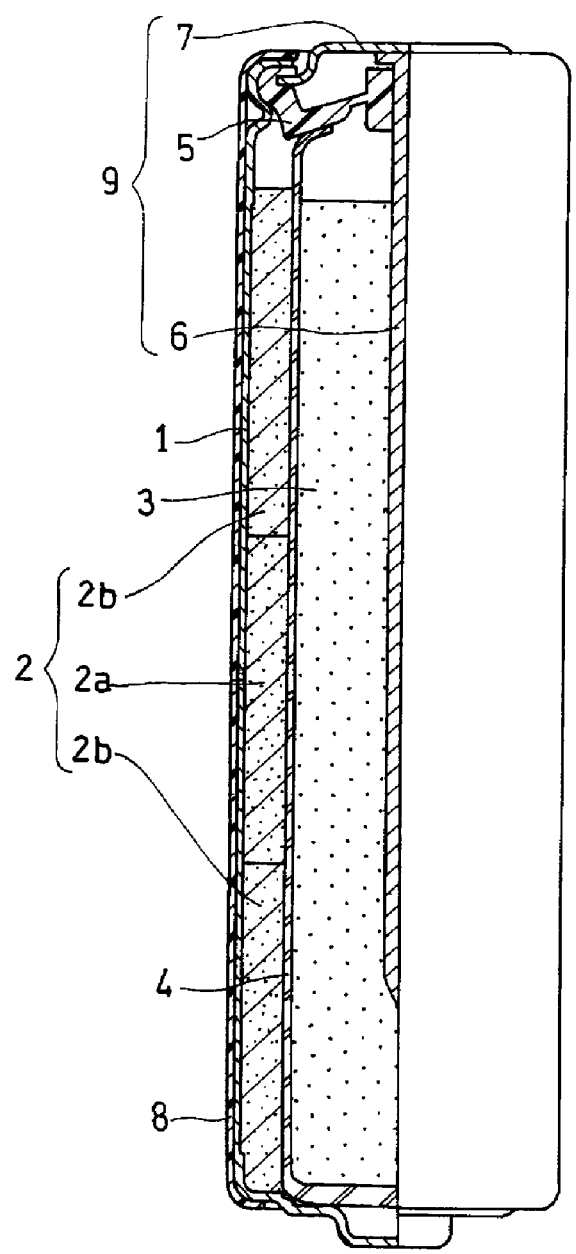
FIG. 1 is a longitudinal sectional view showing an outline of an alkaline dry cell in accordance with a first exemplary embodiment of the present invention.

An alkaline dry cell in accordance with the present disclosure includes a bottomed cylindrical cell case, a positive electrode packed in the cell case and made of a stack of n pieces of hollow cylindrical pellets, a negative electrode disposed in a hollow portion of the pellets, a separator interposed between the positive electrode and the negative electrode, and an alkaline electrolytic solution. A thickness of the body portion of the cell case is 0.08 to 0.16 mm. The positive electrode includes manganese dioxide and a conductive agent, and n is an integer of 3 or more. An average density $d_m$ of manganese dioxide in the n pellets is 2.80 to 3.00 g/cm$^3$. A density $d_c$ of manganese dioxide of at least one pellet positioned in a middle portion in a height direction of the stack is 2.75 g/cm$^3$ or less.

In order to increase a capacity of the alkaline dry cell, in general, it is effective to increase a density of manganese dioxide as a positive electrode active material in the positive electrode. However, when the density of manganese dioxide in a positive electrode is increased, expansion of the positive electrode at the time of discharging is remarkable. Expansion of this positive electrode is particularly remarkable in the vicinity of a middle (a region other than the both end parts) in the height direction of a cell. Therefore, when a cell case having a body portion whose thickness is small is used in a state in which the density of manganese dioxide is increased, a rupture occurs from a vicinity of the middle in the cell case.

As mentioned above, the present disclosure relates to an alkaline dry cell in which a thickness of a body portion is small as 0.08 to 0.16 mm and the average density of manganese dioxide of the n pellets constituting a positive electrode is high as 2.80 to 3.00 g/cm$^3$. Study by the present inventors has revealed that the above-mentioned alkaline dry cell has a high capacity, but a rupture of the cell case easily occurs. However, in the present disclosure, a density $d_c$ of manganese dioxide of at least one pellet positioned in a middle portion in the height direction of the stack of n pellets of the positive electrode is 2.75 g/cm$^3$ or less. Therefore, even when the positive electrode greatly expands in the vicinity of the middle in the height direction, stress caused by the expansion can be absorbed by pellets having lower density positioned in the middle portion. Therefore, although the cell has a high capacity, a rupture of a body portion of a cell case can be suppressed. Note here that the vicinity of the middle of the positive electrode (or in the height direction of the stack) is a region (a middle region) other than the both end parts of the positive electrode.

The middle region is referred to, for example, a region in the predetermined height including a surface as the center, which passes through a center in the height direction of the stack and is perpendicular to the height direction (or an axial direction) (hereinafter, the surface is also referred to as a center surface). The pellet positioned in the middle portion in the height direction of the stack means one pellet through which the above-mentioned center surface passes or two pellets sandwiching the center surface, regardless of whether n is an odd number or an even number. When n is an odd number, a pellet positioned in the middle portion is usually one pellet through which the center surface passes. When n is an even number, a pellet positioned in the middle portion is usually (a pair of) two pellets sandwiching the center surface.

In the present disclosure, a density $d_c$ of manganese dioxide of at least one pellet positioned in a middle portion in the height direction of the stack may be 2.75 g/cm$^3$ or less. When a pellet positioned in the middle portion is one pellet passing through the center surface, the density $d_c$ of the one pellet is only required to be in the above-mentioned range. When the pellet positioned in the middle portion is two pellets sandwiching the center surface, the density $d_c$ of at least one pellet among these two pellets is only required to be in the above-mentioned range, or the density $d_c$ of both of the two pellets may be in the above-mentioned range. Note here that it is preferable that the adjacent pellets are brought into contact with each other without a gap therebetween.

The density of manganese dioxide of each pellet can be calculated by dividing a mass of manganese dioxide included in the pellet by a volume of the pellet. The average density of manganese dioxide of n pellets can be calculated by dividing the total mass of manganese dioxides contained in the pellets by total volume of the pellets.

A total mass of manganese dioxide contained in the pellet can be calculated by taking the pellet from the cell, sufficiently dissolving the pellet in acid, then removing insoluble parts and collecting a solution, measuring the content of Mn contained in the solution by high-frequency Inductively Coupled Plasma-Optical Emission Spectrometry (ICP Optical Emission Spectrometry), and converting the content into a MnO$_2$ amount. The volume of pellet can be obtained by, for example, measuring the outer diameter, inner diameter, and height of each pellet in the X-ray CT image of the cell, and calculating a volume of the pellet based on these measured values.

The volume of the pellet changes by immersing the pellet in an alkaline electrolytic solution, or discharging the cell. Therefore, the density of manganese dioxide of the pellet in the cell or the average density of the manganese dioxide of n pellets may be obtained with respect to, for example, those of an alkaline dry cell in the initial state. The alkaline dry cell in the initial state is, for example, an alkaline dry cell after assembly of a cell (or after aging the assembled cell) and before first discharging.

Hereinafter, an alkaline dry cell in accordance with the present disclosure is described in detail with reference to drawings. Note here that the present invention is not limited to the following exemplary embodiments. Furthermore, any appropriate modifications can be carried out in a range of the scope in which the advantageous effect of the present invention is exhibited. Furthermore, the exemplary embodiments may be combined with the other exemplary embodiments.

Figure 2:
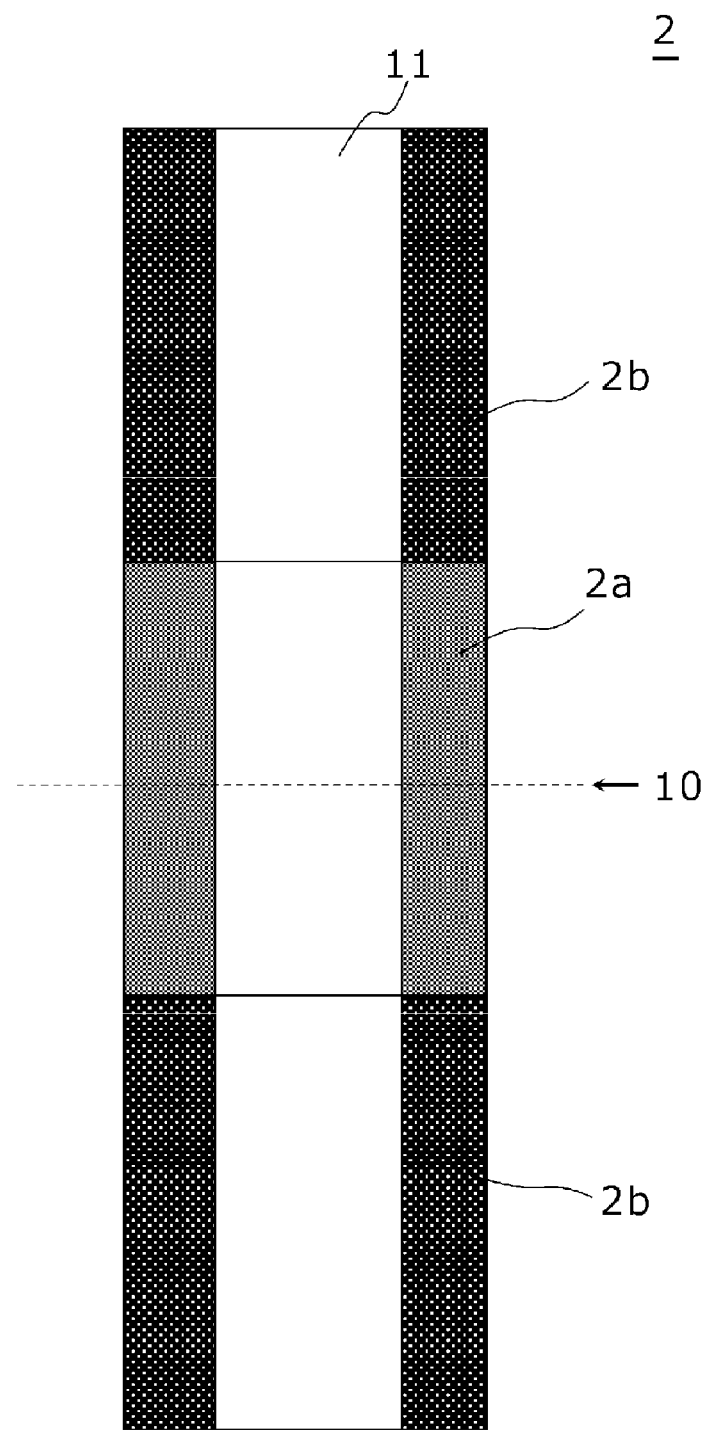
FIG. 2 is an outline longitudinal sectional view schematically showing a positive electrode included in the alkaline dry cell of FIG. 1.

FIG. 1 is a front view showing an alkaline dry cell (first exemplary embodiment) in accordance with the present invention with a lateral half shown in a sectional view. FIG. 2 is an outline side view schematically showing positive electrode 2 included in the alkaline dry cell of FIG. 1.

As shown in FIGS. 1 and 2, the alkaline dry cell includes hollow cylindrical positive electrode 2, negative electrode 3 disposed in a hollow portion of positive electrode 2, separator 4 interposed between positive electrode 2 and negative electrode 3, and an alkaline electrolytic solution (not shown). These are housed in bottomed cylindrical cell case 1 serving as a positive terminal. Positive electrode 2 is packed into cell case 1. Gelled negative electrode 3 is packed into the hollow portion of positive electrode 2 with separator 4 between positive electrode 2 and negative electrode 3.

Separator 4 has a bottomed cylindrical shape. Separator 4 is disposed on the inner surface of the hollow portion of positive electrode 2, separates positive electrode 2 from negative electrode 3, and separates negative electrode 3 from cell case 1. Positive electrode 2 includes manganese dioxide and a conductive agent. Negative electrode 3 usually includes an alkaline electrolytic solution and a gelling agent, in addition to a negative electrode active material containing zinc.

An opening of cell case 1 is sealed by sealing unit 9. Sealing unit 9 includes gasket 5, negative electrode terminal plate 7 that serves as a negative electrode terminal, and negative electrode current collector 6. Negative electrode current collector 6 is inserted into negative electrode 3. Negative electrode current collector 6 has a nail-shape having a head portion and a body portion, and the body portion is inserted into a through-hole provided in the middle cylinder part of gasket 5, and the head portion of negative electrode current collector 6 is welded to a flat part of the middle portion of negative electrode terminal plate 7. An opening end part of cell case 1 is crimped to a flange portion of peripheral end part of negative electrode terminal plate 7 via the outer peripheral end of gasket 5. The outer surface of cell case 1 is coated with external label 8.

In FIG. 2, positive electrode 2 is made of a stack of three pellets in total (n=3) including one pellet 2a and two pellets 2b sandwiching pellet 2a, which have a hollow cylindrical shape having hollow portion 11. Three pellets 2a and 2b, are produced in substantially the same size (or the same height). Center surface 10 positioned in the center in the height direction of the stack passes through pellet 2a disposed in the middle in the three pellets.

The density $d_c$ of manganese dioxide of pellet 2a positioned in the middle portion in the height direction of the positive electrode is set to be smaller than the average density $d_m$ of manganese dioxide of n pellets, and specifically set to be 2.75 g/cm$^3$ or less. Thus, expansion in the middle portion of the positive electrode is suppressed, so that a rupture in the vicinity of the middle of the cell case can be suppressed. When the density of manganese dioxide of the pellet positioned in the middle portion is set to be 2.75 g/cm$^3$ or less, an appropriate amount of air gaps can be provided inside the pellet. By absorbing the expansion of manganese dioxide after discharging by the above-mentioned air gaps, the expansion of the pellet toward the outer diameter direction can be suppressed.

In order to make the density $d_c$ of manganese dioxide of pellet 2a positioned in the middle portion be smaller than the average density $d_m$ of manganese dioxide of n pellets, it is necessary to make the density of pellet 2a positioned in the middle portion be smaller than the density of manganese dioxide of the other pellets 2b. In FIG. 2, the density distribution state of manganese dioxide in the stack is schematically shown by lightness and darkness in color. Pellet 2a positioned in the middle portion in the height direction of the stack is shown in a lighter color (that is, has lower density of manganese dioxide) than two pellets 2b positioned at both end parts.

Figure 3:
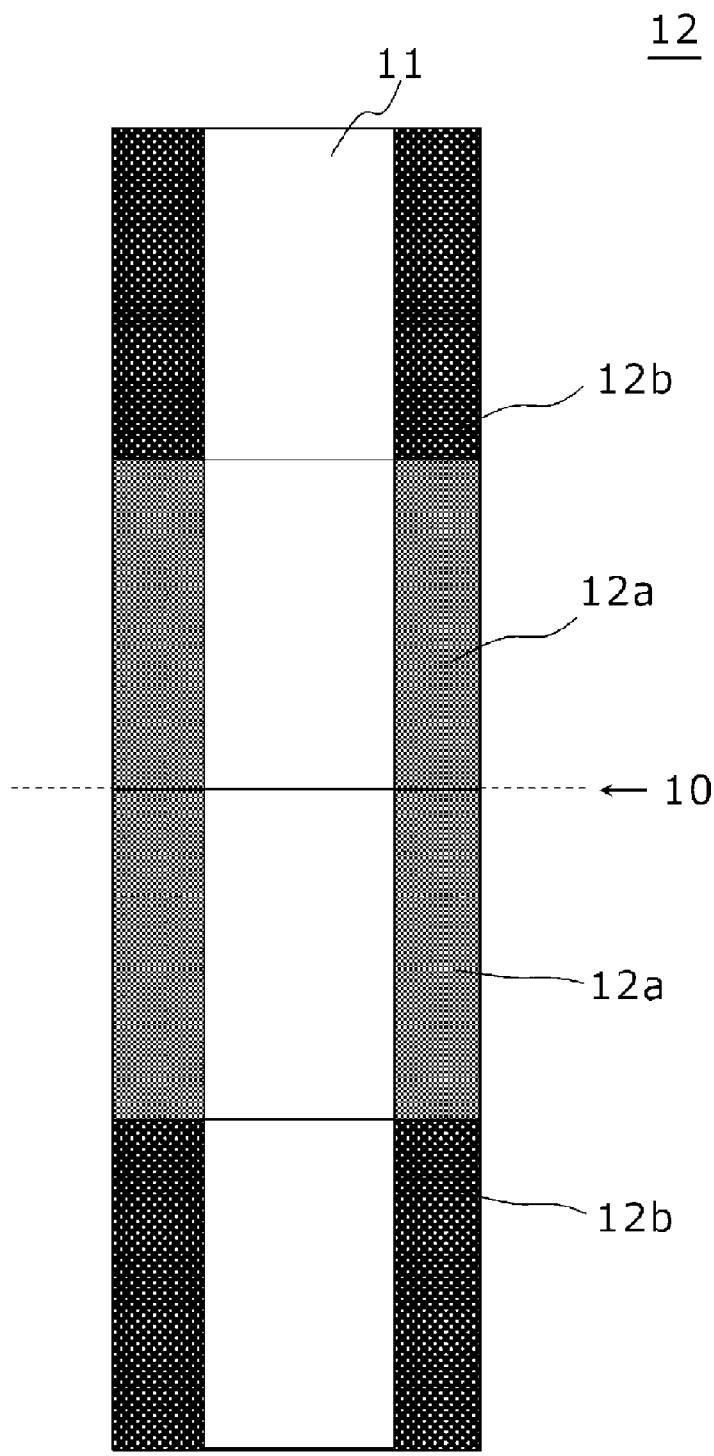
FIG. 3 is an outline longitudinal sectional view schematically showing a positive electrode included in the alkaline dry cell in accordance with a second exemplary embodiment of the present invention.

FIG. 3 is an outline sectional view schematically showing a positive electrode included in the alkaline dry cell in accordance with another exemplary embodiment (second exemplary embodiment) of the present invention. FIG. 3 is the same as FIG. 2 except for the number of pellets constituting positive electrode 12 and a density distribution state of manganese dioxide in the stack. In FIG. 3, positive electrode 12 is made of a stack of four pellets in total (n=4), that is, two pellets 12a positioned in the middle portion in the height direction of the stack and two pellets 12b adjacent to the two pellets 12a. Both pellets 12a and 12b have a hollow cylindrical shape having hollow portion 11.

Center surface 10 positioned at the center in the height direction of the stack is positioned at the interface between the two pellets 2a positioned in the middle portion. Also in FIG. 3, the density distribution state of manganese dioxide in the stack is schematically shown by lightness and darkness in color. In example of FIG. 3, two pellets 12a positioned in the middle portion in the height direction of the stack are shown in lighter color (that is, have a lower density of manganese dioxide) than two pellets 12b positioned at both end parts.

Figure 4:
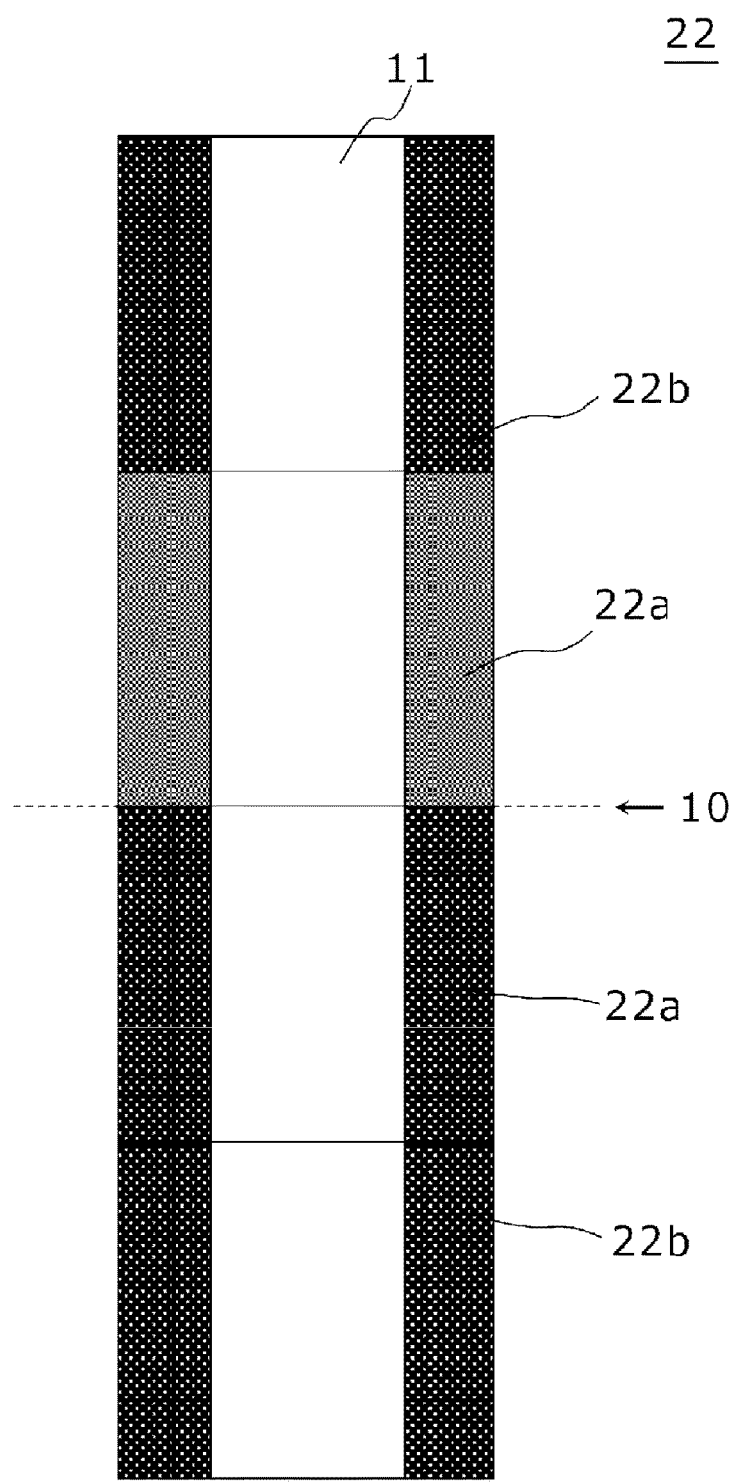
FIG. 4 is an outline longitudinal sectional view schematically showing a positive electrode included in the alkaline dry cell in accordance with a third exemplary embodiment of the present invention.

However, the configuration is not necessarily limited to the case of FIG. 3, and at least one of the two pellets positioned in the middle portion in the height direction of the stack may have a density of manganese dioxide of 2.75 g/cm$^3$. FIG. 4 shows an example in which the density of manganese dioxide is low (2.75 g/cm$^3$ or less) in one of the two pellets positioned in the middle portion.

FIG. 4 is an outline sectional view schematically showing a positive electrode included in an alkaline dry cell in accordance with a third exemplary embodiment of the present invention. FIG. 4 is the same as FIG. 3 except for the density distribution state of manganese dioxide in the stack. In FIG. 4, positive electrode 22 is made of a stack of four pellets in total (n=4), that is, two pellets 22a positioned in the middle portion in the height direction of the stack and two pellets 22b adjacent to the two pellets 22a. Both pellets 22a and 22b have a hollow cylindrical shape having hollow portion 11.

In FIG. 4, in one pellet 22a of two pellets 22a positioned in the middle portion in the height direction of the stack, the color is lighter. In the remaining pellet 22a and pellets 22b at the both end parts, the color is darker. In other words, one of the two pellets 22a positioned in the middle portion has lower density of manganese dioxide as compared with the other pellets 22a and 22b.

Hereinafter, the detail of an alkaline dry cell is described.

Positive Electrode

A positive electrode is made of a stack of n hollow cylindrical pellets and is packed in a bottomed cylindrical cell case. The positive electrode includes manganese dioxide as a positive electrode active material. In the present invention, in n pellets (i.e., a stack of pellets) included in the positive electrode, the average density of manganese dioxide is 2.80 to 3.00 g/cm$^3$, and may be 2.90 to 3.00 g/cm$^3$. Even in such a high density, according to the present invention, the density $d_c$ of manganese dioxide of at least one pellet positioned in the middle portion in the height direction of the stack is set to be lower than the above-mentioned average density, specifically, it is set to be 2.75 g/cm$^3$ or less, a rupture of a cell case can be suppressed although a cell case having a body portion whose thickness is small is used.

The density $d_c$ of manganese dioxide may be 2.75 g/cm$^3$ or less, and the lower limit is not particularly limited as long as the average density $d_c$ satisfies the above-mentioned range. In view of easy absorption of stress generated in association with expansion, while the high capacity is maintained, the density $d_c$ of manganese dioxide is, for example, 2.50 g/cm$^3$ or more and preferably 2.60 g/cm$^3$ or more.

"n" is an integer of 3 or more, preferably an integer of 3 to 8, and more preferably an integer of 3 to 6. When n is in such a range, the distribution state of the density of manganese dioxide between the pellets can be easily adjusted.

In pellets other than the pellet having a density of manganese dioxide of 2.75 g/cm$^3$ or less, densities of manganese dioxide of respective pellets may be the same as or different from each other as long as the average density $d_m$ is in the above-mentioned range.

The sizes of the pellets may be the same as or different from each other. Furthermore, a part of the pellets may be the same size as each other.

As manganese dioxide as the positive electrode active material, electrolytic manganese dioxide is preferable.

The manganese dioxide is used in a form of powder. In view of easily achieving the packing property of the positive electrode and diffusivity of an electrolytic solution in the positive electrode, the average particle diameter (D50) of manganese dioxide is, for example, 25 to 60 μm. In view of formability and suppression of expansion of the positive electrode, a BET specific surface area of manganese dioxide may be, for example, 15 to 50 m$^2$/g.

Note here that the average particle diameter (D50) in this specification is a median diameter in a volumetric particle size distribution. The average particle diameter is calculated using, for example, a laser diffraction/scattering particle size distribution meter. Furthermore, the BET specific surface area is obtained by measuring and calculating a surface area using a BET equation, which is a theoretical equation of multilayer adsorption. The BET specific surface area can be measured using, for example, a specific surface area measuring device by a nitrogen adsorption method.

The positive electrode further includes a conductive agent in addition to the positive electrode active material, and usually further includes an alkaline electrolytic solution. Furthermore, the positive electrode may further include a binder as necessary.

Examples of the conductive agent include carbon black such as acetylene black, and a conductive carbon material such as graphite. As the graphite, natural graphite, artificial graphite, and the like, can be used. The conductive agent may be fibrous and the like, but it is preferably powdery. The average particle diameter (D50) of the conductive agent is, for example, 3 to 30 μm.

The content of the conductive agent in the positive electrode is, for example, 3 to 10 parts by mass and preferably 4 to 6 parts by mass with respect to 100 parts by mass of manganese dioxide.

The pellet is obtained by compression-molding a positive electrode material mixture including, for example, a positive electrode active material, a conductive agent, an alkaline electrolytic solution, and a binder as necessary, into a desired shape. The positive electrode material mixture is formed into a flake shape or a granular shape, and classified as necessary, followed by compression-molding. By adjusting pressure for the compression-molding, the density of manganese dioxide in each pellet can be adjusted. Furthermore, the pellet is inserted into the cell case using a predetermined instrument. At this time, secondary pressurization may be carried out. By adjusting the degree of the secondary pressurization, the density of manganese dioxide of each pellet can be adjusted.

Negative Electrode

A negative electrode is disposed in a hollow portion of positive electrode pellets. The negative electrode has a gelled form. The negative electrode usually contains powder of zinc or a zinc alloy as a negative electrode active material, an alkaline electrolytic solution, and a gelling agent.

In view of corrosion resistance, the zinc alloy preferably includes at least one selected from the group consisting of indium, bismuth and aluminum. The negative electrode active material is usually used in a form of powder. In view of the packing property of the negative electrode and diffusivity of an alkaline electrolytic solution inside the negative electrode, the average particle diameter (D50) of the negative electrode active material powder is, for example, 100 to 200 μm, and preferably 110 to 160 μm.

The gelling agent is not particularly limited and any well-known gelling agents to be used in the field of alkaline dry cells can be used. For example, a thickener and/or a water absorbing polymer can be used. Examples of such gelling agents include polyacrylic acid and sodium polyacrylate.

The addition amount of the gelling agent is, for example, 0.5 to 2 parts by mass with respect to 100 parts by mass of the negative electrode active material.

The content of powder of zinc or a zinc alloy is, for example, 170 to 220 parts by mass with respect to 100 parts by mass of the alkaline electrolytic solution.

For the negative electrode, for adjusting the corrosion resistance of zinc, surfactants such as a polyoxyalkylene group-containing compound, and phosphate ester (for example, phosphate ester or an alkali metal salt thereof, and the like) may be used.

Negative Electrode Current Collector

A negative electrode current collector is inserted into a gelled negative electrode. Examples of material of the negative electrode current collector is an alloy containing copper and zinc, such as brass. The negative electrode current collector may be subjected to metal plating such as tin plating, as necessary.

Separator

Examples of a separator interposed between a positive electrode and a negative electrode include non-woven fabric and microporous films. Examples of material of the separator include cellulose, polyvinyl alcohol, and the like. As the non-woven fabric, for example, one mainly including fibers of these materials is used. As the microporous films, cellophane is used.

FIG. 1 shows a bottomed cylindrical separator, but the separator is not necessarily limited to this and any well-known separators used in the field of alkaline dry cells can be used. For example, a cylindrical separator and a bottom insulator (or a bottom separator) may be used together.

A thickness of the separator is, for example, 200 to 300 μm. The separator preferably has the above-mentioned thickness as a whole, and when a separator is made by stacking a plurality of sheets, the total thickness of the sheets is preferably in the above-mentioned range.

Alkaline Electrolytic Solution

An alkaline electrolytic solution (electrolyte) is included in a positive electrode, a negative electrode and a separator. As the alkaline electrolytic solution, for example, an alkaline aqueous solution including potassium hydroxide is used. The concentration of potassium hydroxide in the alkaline electrolytic solution is preferably 30 to 50% by mass. The alkaline aqueous solution may further contain zinc oxide. The concentration of zinc oxide in the alkaline electrolytic solution is, for example, 1 to 5% by mass.

Cell Case

A bottomed cylindrical case is used as a cell case. The cell case is made of, for example, a nickel-plated steel sheet. In order to achieve good adhesion between the positive electrode and the cell case, the inner surface of the cell case may be coated with a carbon coating film.

The cell case includes a circular bottom portion, and a cylindrical body portion integrated with the bottom portion and extending from the periphery of the bottom portion in the direction perpendicular to the bottom portion (in the height direction of the cell or the positive electrode). In the present invention, the thickness of the body portion of the cell case is controlled to 0.08 to 0.16 mm. However, when the density of manganese dioxide of the pellet positioned in the middle portion of the stack is set to be 2.75 g/cm$^3$ or less, a rupture of the cell case cause by the expansion of the positive electrode can be suppressed even with such a small thickness. Furthermore, when a thickness of the body portion is small, high capacity can be secured.

The thickness of the body portion may be, for example, 0.08 to 0.14 mm. In the present invention, even when the thickness of the body portion is such extremely small as, for example, 0.08 to 0.12 mm or 0.08 to 0.10 mm, a rupture of the cell case can be effectively suppressed. In this way, small thickness of the body portion is also advantageous in view of increasing capacity. In view of enhancing the effect of suppressing a rupture of the cell case while high capacity is secured, the thickness of the body portion may be 0.10 to 0.16 mm or 0.12 to 0.16 mm.

In the present invention, a high capacity is obtained, and a rupture of the body portion can be suppressed even when the thickness of the body portion of the cell case is small. Therefore, the present invention is suitable particularly for batteries such as AA cells and AAA cells.

EXAMPLES

Hereinafter, the present invention is described specifically based on Examples and Comparative Examples, but the present invention is not necessarily limited to the following Examples.

Example 1

AA alkaline dry cells (LR6) shown in FIG. 1 were produced according to the following procedures (1) to (3).

(1) Production of Positive Electrode

Electrolytic manganese dioxide powder (manganese dioxide purity: 93%, average particle diameter D50: 40 µm, BET specific surface area: 26 $m^2$/g) as a positive electrode active material, graphite powder as a conductive agent, and polytetrafluoroethylene as a binder were mixed with each other. An electrolytic solution was added to the resultant mixture. These were sufficiently stirred, then compression-molded into flakes, and further pulverized into granules to obtain a positive electrode material mixture. The mass ratio of the respective components, that is, the ratio of electrolytic manganese dioxide powder:graphitepowder:electrolytic solution was set to 95:5:2. The binder was used at the rate of 0.2% by mass with respect to electrolytic manganese dioxide. The electrolytic solution to be used was an alkaline aqueous solution including potassium hydroxide (concentration: 35% by mass) and zinc oxide (concentration: 2% by mass).

The positive electrode material mixture was pressure-molded into a hollow cylindrical shape using a mold to produce a pellet having an outer diameter of 13.60 mm, inner diameter of 8.85 mm, and height of 14.5 mm. By adjusting the pressure of compression-molding at this time, one pellet a1 having a density of manganese dioxide of 2.95 g/$cm^3$, and two pellets each having a density of manganese dioxide of 3.05 g/$cm^3$ were produced. The densities of manganese dioxide of these pellets were values at the time of production of pellets. The density of manganese dioxide of the produced pellet was calculated by dividing a mass of manganese dioxide calculated from a raw material composition by a volume calculated from the pellet size.

(2) Production of Negative Electrode

Zinc alloy powder as a negative electrode active material (average particle diameter D50: 130 µm), the above-mentioned electrolytic solution, and a gelling agent were mixed with each other to obtain gelled negative electrode 3. As the zinc alloy, a zinc alloy including 0.02% by mass of indium, 0.01% by mass of bismuth, and 0.005% by mass of aluminum was used. For the gelling agent, a mixture including crosslinked and branched polyacrylic acid and highly crosslinked chain sodium polyacrylate at a mass ratio of 1:2 was used. The mass ratio of negative electrode active material: electrolytic solution:gelling agent was set to 200:100:2.

(3) Assembly of Alkaline Cell

Varniphite manufactured by Nippon Graphite Industries, Ltd. was applied onto the inner surface of a bottomed cylindrical cell case (thickness of a body portion: 0.16 mm) made of a nickel-plated steel plate to form a carbon coating film with a thickness of approximately 10 µm to obtain cell case 1. Three positive electrode pellets were inserted into cell case 1 in the longitudinal direction. At this time, the pellets were inserted from a positive terminal side of the cell case such that two pellets a2 were positioned in the first and third stages, and pellet a1 (as the pellet in the second stage) was positioned between these two pellets a2. The bottomed cylindrical separator was disposed at the inner side of positive electrode 2, and then the above-mentioned electrolytic solution was poured, and separator 4 was impregnated with the electrolytic solution. This state was left for a predetermined time to infiltrate the electrolytic solution from separator 4 into positive electrode 2. Thereafter, a predetermined amount of gelled negative electrode 3 was packed into the inside of separator 4. Separator 4 used was a non-woven fabric mainly including solvent-spun cellulose fibers and polyvinyl alcohol fibers mixed in a mass ratio of 1:1.

General brass (Cu content: about 65% by mass, Zn content: about 35% by mass) was pressed into a nail shape, and then the surface was plated with tin to obtain negative electrode current collector 6. The diameter of the body portion of negative electrode current collector 6 was set to 1.15 mm. The head of negative electrode current collector 6 was electrically welded to negative electrode terminal plate 7 made of a nickel plated steel plate. Thereafter, the body portion of negative electrode current collector 6 was press-fitted into the through-hole at the center of gasket 5 mainly including polyamide 6, 12. In this way, sealing unit 9 consisting of gasket 5, negative electrode terminal plate 7, and negative electrode current collector 6 was produced.

Next, sealing unit 9 was installed in the opening of cell case 1. At this time, the body portion of negative electrode current collector 6 was inserted into negative electrode 3. The opening end part of cell case 1 was crimped onto the periphery of negative electrode terminal plate 7 with gasket 5 interposed therebetween to seal the opening of cell case 1. The outer surface of cell case 1 was coated with outer label 8. In this way, alkaline dry cells (cells A1) were produced.

(4) Evaluation

One week after the production of the cells, X-ray CT images of the obtained alkaline dry cells were picked up, and a volume of a pellet was calculated. The cell one week after the production was defined as cell in the initial state. Furthermore, based on this value, according to the aforementioned procedure, the density of manganese dioxide of each pellet and the average density of manganese dioxide of all the pellets were obtained.

Furthermore, the produced alkaline dry cell was continuously discharged at resistance of 40Ω. One week after, a rupture of the cell case was visually observed. The number of cells of 10 cells, in which a rupture of a cell case occurred, was counted.

Examples 2 to 5 and Comparative Example 1

Three pellets were produced respectively such that densities of manganese dioxide of pellets (at the time of production of pellets) became values shown in Table 1 by adjusting a pressure of compression-molding in the production of the positive electrode in Example 1 (1). Then, a pellet having each density was inserted into the cell case such that a position from a positive terminal side is in the position shown in Table 1 in Example 1 (3). Thus, the alkaline dry cells A2 to A5 and B1 were produced in the same manner as in Example 1 except for the above. The produced cells were evaluated.

Results of Examples 1 to 5 and Comparative Example 1 are shown in Table 1. Examples 1 to 5 are A1 to A5, and Comparative Example 1 is B1.

TABLE 1

| | Thickness of body portion of case (mm) | n | MnO$_2$ density in production of pellet (g/cm$^3$) | | MnO$_2$ density in cell (g/cm$^3$) | | Average density | Rapture of case (cells/10 cells) |
| --- | --- | --- | --- | --- | --- | --- | --- | --- |
| | | | Pellet a2 (first and third stages) | Pellet a1 (second stage) | Pellet a2 (first and third stages) | Pellet a1 (second stage) | | |
| B1 | 0.16 | 3 | 3.00 | 3.00 | 2.800 | 2.80 | 2.80 | 2 |
| A1 | 0.16 | 3 | 3.05 | 2.95 | 2.825 | 2.75 | 2.80 | 0 |
| A2 | 0.16 | 3 | 3.10 | 2.95 | 2.900 | 2.75 | 2.85 | 0 |
| A3 | 0.16 | 3 | 3.15 | 2.95 | 2.975 | 2.75 | 2.90 | 0 |
| A4 | 0.16 | 3 | 3.25 | 2.95 | 3.050 | 2.75 | 2.95 | 0 |
| A5 | 0.16 | 3 | 3.30 | 2.95 | 3.125 | 2.75 | 3.00 | 0 |

As shown in Table 1, in Examples 1 to 5, 0% cells had a rupture in the cell cases. Although the average density of manganese dioxide was high, and the thickness of the body portion was small as 0.16 mm, a rupture of cell was suppressed. On the contrary, Comparative Example 1, 20% of the cells had a rupture in the cell case.

Examples 6 to 9 and Comparative Example 2

Pellets having outer diameters shown in Table 2 were produced by adjusting the dimension of a mold. Alkaline dry cells A6 to A9 and B1 were produced in the same manner as in Example 5 except that the above-produced pellets were used, and the produced cells were evaluated. In these examples, by adjusting an outer diameter of a pellet, the thicknesses of the body portion of the cell case are changed to those shown in Table 2.

Results are shown in Table 2. In Table 2, the result of Example 5 is shown together. Examples 5 to 9 are A5 to A9, and Comparative Example 2 is B2.

TABLE 2

| | Thickness of body portion (mm) | n | Outer diameter of pellet (mm) | MnO$_2$ density in production of pellet (g/cm$^3$) | | MnO$_2$ density in cell (g/cm$^3$) | | Average density | Rapture of case (cells/10 cells) |
| --- | --- | --- | --- | --- | --- | --- | --- | --- | --- |
| | | | | Pellet a2 (first and third stages) | Pellet a1 (second stage) | Pellet a2 (first and third stages) | Pellet a1 (second stage) | | |
| A5 | 0.16 | 3 | 13.60 | 3.30 | 2.95 | 3.125 | 2.75 | 3.00 | 0 |
| A6 | 0.14 | 3 | 13.62 | 3.30 | 2.95 | 3.125 | 2.75 | 3.00 | 0 |
| A7 | 0.12 | 3 | 13.64 | 3.30 | 2.95 | 3.125 | 2.75 | 3.00 | 0 |
| A8 | 0.10 | 3 | 13.66 | 3.30 | 2.95 | 3.125 | 2.75 | 3.00 | 0 |
| A9 | 0.08 | 3 | 13.68 | 3.30 | 2.95 | 3.125 | 2.75 | 3.00 | 0 |
| B2 | 0.06 | 3 | 13.70 | 3.30 | 2.95 | 3.125 | 2.75 | 3.00 | 3 |

As shown in Table 2, in the cells of Examples 5 to 9 in which the thickness of the body portion of the cell case is 0.08 to 0.16 mm, 0% cells had a rupture of the cell case. On the contrary, in the cell of Comparative Example 2 in which the thickness of the body portion is 0.06 mm, 30% of the cells had a rupture of the cell case.

Note here that in Tables 1 and 2, "MnO$_2$ density in production of pellet" represents a density of manganese dioxide at the time of production of a pellet, and "MnO$_2$ density in cell" represents a density of manganese dioxide and an average density calculated based on the volume of a pellet measured one week after the production of a cells, respectively.

Example 10

Four pellets were produced by changing the height of the pellet to 10.88 mm in Example 1 (1). At this time, by adjusting the pressure of the compression-molding, two pellets a1 having a density of manganese dioxide of 2.95 g/cm$^3$ and two pellets a2 having a density of manganese dioxide of 3.40 g/cm$^3$ were produced. Values of the densities of manganese dioxide of these pellets are values at the production time of the pellets. The four pellets were inserted into the cell case in the longitudinal direction in Example 1 (3). At this time, the pellets were inserted from a positive terminal side of the cell case such that two pellets a2 were used in the first and fourth stages, and pellets a1 were positioned (as the pellets in the second and third stages) between these two pellets a2. Thus, alkaline dry cell A10 was produced in the same manner as in Example 1 except for the above. The produced pellets were evaluated.

One week after the cells were produced, the volumes of pellets were measured, and the density of manganese dioxide of each pellet and the average density of manganese dioxide of all the pellets were obtained. As a result, the density of manganese dioxide of pellets a2 in the first and fourth stages was 3.25 g/cm$^3$, and the density of manganese dioxide of pellets a1 of the second and third stages was 2.75 g/cm$^3$. Furthermore, the average density of manganese dioxide of four pellets was 3.00 g/cm$^3$. Then, 0 of 10 cells (0%) had a rupture in the cell case, showing that a rupture of the cell case was suppressed.

In an alkaline dry cell according to the present invention, capacity can be increased, and a rupture of a cell case can be suppressed. Therefore, the alkaline dry cell can be suitably used as a power supply of electric devices such as portable devices.

The invention claimed is:
1. An alkaline dry cell comprising:
a bottomed cylindrical cell case;
a positive electrode packed in the cell case, and is made of a stack of n pieces of hollow cylindrical pellets;
a negative electrode disposed in a hollow portion of the pellets;
a separator interposed between the positive electrode and the negative electrode; and
an alkaline electrolytic solution,
wherein a thickness of a body portion of the cell case is 0.08 to 0.16 mm,
the positive electrode includes manganese dioxide and a conductive agent,
n is an integer of 3 or more,
an average density $d_m$ of manganese dioxide of the n pieces of the pellets is 2.80 to 3.00 g/cm$^3$, and
a density $d_c$ of manganese dioxide of at least one pellet positioned in a middle portion in a height direction of the stack is 2.75 g/cm$^3$ or less.
2. The alkaline dry cell according to claim 1, wherein n is an integer of 3 to 8.

* * * * *